No. 859,074. PATENTED JULY 2, 1907.
E. KEMPSHALL.
ARMOR FOR TIRES.
APPLICATION FILED JUNE 1, 1906.

Witnesses

Inventor
Eleazer Kempshall
By
Attorney

UNITED STATES PATENT OFFICE.

ELEAZER KEMPSHALL, OF BOSTON, MASSACHUSETTS.

ARMOR FOR TIRES.

No. 859,074.

Specification of Letters Patent.

Patented July 2, 1907.

Application filed June 1, 1906. Serial No. 319,779.

*To all whom it may concern:*

Be it known that I, ELEAZER KEMPSHALL, a citizen of the United States, residing at Boston, in the county of Suffolk and State of Massachusetts, have invented certain new and useful Improvements in Armors for Tires, of which the following is a specification.

This invention relates to improvements in armors for rubber tires.

The object of the invention is to provide an armor for tires, composed of a series of individual elements arranged transversely of the tire tread, and having their ends embedded, or clenched in the cover, at a point beyond the operative tread surface. The purpose of employing the individual transverse elements and fastening them beyond the tread surface is to prevent them becoming disengaged or, picked out of the cover, by the action of the tire when moving.

The invention further consists in the specific arrangement of parts, and details of construction as will be hereinafter pointed out.

Figure 1:
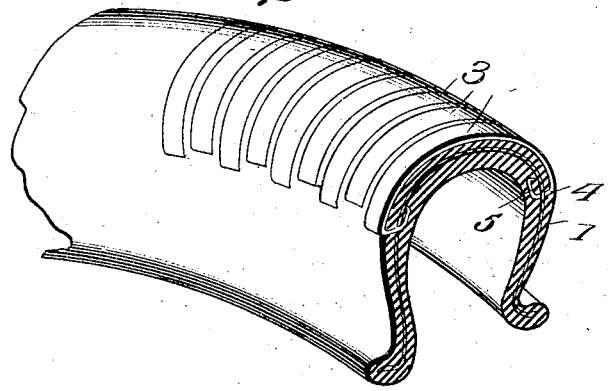
Figure 2:
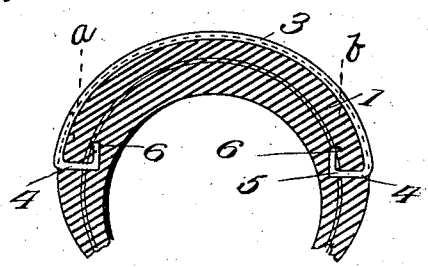
Figure 3:
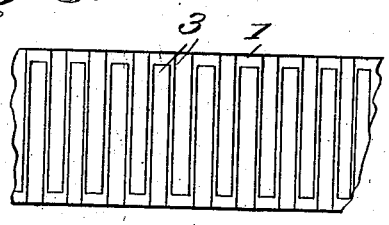
Figure 4:
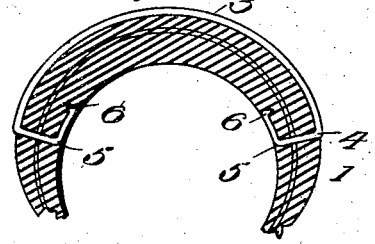
Figure 5:

In the drawings—Figure 1 is a detail perspective view of my improved tire armor. Fig. 2 is a transverse section of the same. Fig. 3 is a plan view. Fig. 4 is a transverse section illustrating the armor elements clenched on the inside of the cover. Fig. 5 is a detail view of armor element.

The numeral 1, indicates a cover for a tire, composed preferably of rubber and interposed strengthening material, such for instance as fabric. The cover may be of any appropriate shape, and attached to a tire in a convenient manner, but as this forms no part of this invention I do not deem it expedient to show or describe it.

On the cover are arranged a plurality of armor elements 3, having angular ends 4, adapted to be bent inward toward each other as indicated at 5, and over as at 6. The ends 4, are beveled on their edges to permit of convenient assembling on the circumferential cover 1. As shown in Fig. 2, the armor elements are embedded in the cover to prevent them from being accidentally removed, while in Fig. 4, the ends are clenched on the inside of the cover to accomplish the same function.

In assembling the armor elements they are arranged transversely to the tire tread, and slightly spaced from each other. The ends are somewhat staggered to per- mit of a more ready and substantial hold in the cover. It will be observed that the ends engage the cover on each side of the actual operative surface, even when the tire is subjected to unusual load strain, as particularly shown in Figs. 2 and 4. For instance the operative surface of the cover is between the dotted lines $a$—$b$, and while it is true this surface will be somewhat increased under load strain, yet at no time will the ends of the armor elements be in contact with the ground. The object of this particular structure is to prevent the peripherical action, due to the revolution of the wheel, tearing the armor elements from their position. As a matter of fact when the tire is compressed and strain comes on the edges of the operative surface of the armor elements, the latter are buried more deeply in the cover, which serves to make a deeper bite in the cover. The ends of the armor elements are therefore not subjected to the wear, and cannot therefore be easily pulled out or separated from the cover.

An armor for a tire thus constructed presents a yielding surface on the wheel tread, and yet protects the tire against wear, and in case of a pneumatic tire, punctures cannot take place. The arrangement of the armor elements are such as to effectually prevent their being torn from their anchorage and also serves to increase the efficiency of the structure and is a positive means for protecting the tire.

What I claim is:

1. In combination, a tire composed of resilient material and a reinforcing strip of non-resilient material, and a series of transversely arranged armor elements having their ends embedded in the tire beyond the reinforcing strip, and bent to cause the tips of said elements to again engage the reinforcing strip, substantially as described.

2. In combination, a tire composed of resilient material and a reinforcing strip of non-resilient material, and a series of transversely arranged armor elements having their ends bent inwardly toward each other, and then outwardly toward the reinforcing strips of non-resilient material to form hooks.

In testimony whereof I have signed my name to this specification in the presence of two subscribing witnesses.

ELEAZER KEMPSHALL.

Witnesses:
JNO. IMIRIE,
C. L. MATTHEWS.